Nov. 11, 1958
B. M. SHORT
2,860,319
BATTERY CABLE TERMINAL
Filed March 21, 1955
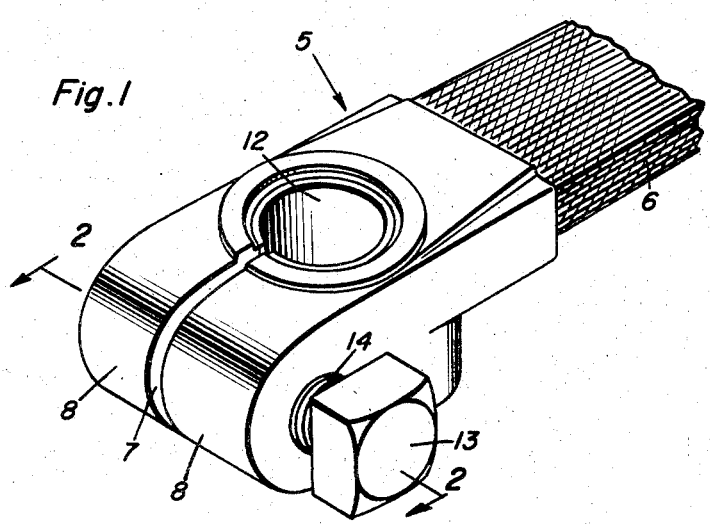
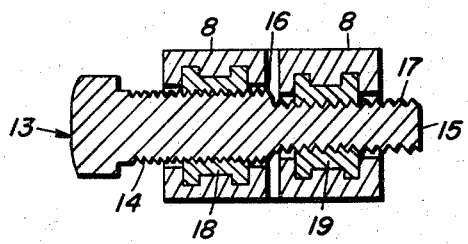
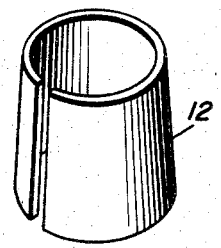
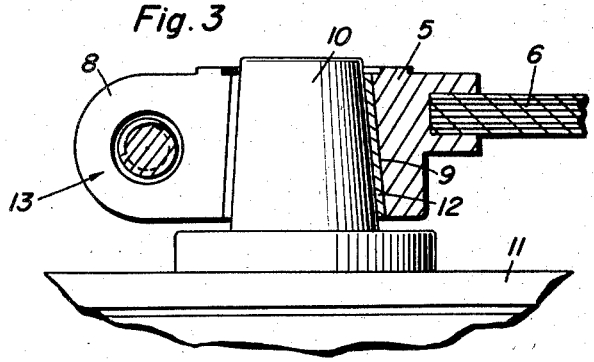
Byerl M. Short
INVENTOR.

United States Patent Office 2,860,319
Patented Nov. 11, 1958

2,860,319

BATTERY CABLE TERMINAL

Byerl M. Short, Billings, Mont., assignor to Empire Cable Corporation, Billings, Mont., a corporation of Montana Application March 21, 1955, Serial No. 495,666

3 Claims. (Cl. 339—231)

The present invention relates to new and useful improvements in battery cable terminals of the deformable U-clamp type and has for its primary object to provide, in a manner as hereinafter set forth, a device of this character comprising novel means for both positively closing and opening or expanding the clamp.

Other objects of the invention are to provide a battery cable terminal of the aforementioned character which will be comparatively simple in construction, strong, durable, compact, highly efficient and reliable in use, and which may be manufactured at low cost.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of a battery cable terminal constructed in accordance with the present invention;

Figure 2 is a view in cross-section through one end portion of the device, taken substantially on the line 2—2 of Figure 1;

Figure 3 is a view in vertical longitudinal section, showing the device in use; and Figure 4 is a detail view in perspective of the split shim which may be used.

Referring now to the drawing in detail, it will be seen that the embodiment of the invention which has been illustrated comprises a somewhat elongated clamp of suitable metal which is designated generally by the reference character 5. The clamp 5 is fixed in the usual manner on one end portion of a conventional battery cable or strap 6.

The forward portion of the clamp 5 is longitudinally split, as at 7, to define a pair of spaced, opposed jaws 8. The split 7 communicates with a tapered vertical opening 9 in the clamp 5 for the reception of the usual post 10 of a storage battery 11. A split shim 12 may, if desired, be used between the post 10 and the clamp 5.

A connecting bolt 13 is provided for opening and closing the jaws 8 on the battery post. Toward this end, the threaded shank 14 of the bolt 13 terminates in a reduced end portion 15 providing, at an intermediate point, a shoulder 16, said reduced end portion 15 being provided with a relatively coarse thread 17 on the same hand as the thread on said shank 14.

As illustrated to advantage in Figure 2 of the drawing, aligned bushings 18 and 19 are molded in the jaws 8 of the clamp 5. The bushings 18 and 19 are internally threaded to receive, respectively, the portions 14 and 17 of the bolt 13. It also will be observed that the bushing 18 is of an internal diameter to permit the insertion therethrough of the reduced end portion 15 of the bolt 13 for engagement in the bushing 19.

It is thought that the manner in which the device is used will be readily apparent from a consideration of the foregoing. Briefly, the clamp 5 is slipped on the battery post 10 in an obvious manner and the bolt 13 is threaded into the bushings 18 and 19. When this is done, the relatively coarse thread 17 turning in the bushing 19 pulls the respective jaw toward the other jaw, thus closing the clamp 5 firmly on the battery post. To open the clamp, the bolt 13 is turned in the opposite direction for positively spreading the jaws 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A battery cable terminal of the character described comprising; a split clamp comprising spaced jaws for the reception of a battery post therebetween, and a connecting bolt extending between the jaws for closing and opening same, said bolt including relatively fine and coarse thread portions of the same hand threadedly engaged in the jaws.

2. A battery cable terminal comprising; a split, resilient clamp comprising spaced jaws for the reception of a battery post therebetween, and means for opening and closing the jaws, said means including a connecting bolt comprising a fine thread engaged in one of the jaws, said bolt further comprising a reduced end portion including a relatively coarse thread of the same hand as said fine thread engaged in the other of said jaws.

3. A battery cable terminal of the character described comprising; a split clamp including a pair of spaced jaws for the reception of a battery post therebetween, aligned bushings mounted in said jaws, and a bolt operatively connecting the jaws for opening and closing same, said bolt including a relatively large, finely threaded portion mounted in one of the bushings, said bolt further including a reduced end portion comprising a relatively coarse thread of the same hand as the thread of said large portion engaged in the other of said bushings.

References Cited in the file of this patent

UNITED STATES PATENTS

| | | |
|---|---|---|
| 1,837,814 | Grunwald | Dec. 22, 1931 |
| 2,531,307 | Thomas | Nov. 21, 1950 |